(12) United States Patent
Fuji

(10) Patent No.: US 7,548,894 B2
(45) Date of Patent: Jun. 16, 2009

(54) ARTIFICIAL NEURAL NETWORK

(75) Inventor: Yukio Fuji, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 390 days.

(21) Appl. No.: 11/473,127

(22) Filed: Jun. 23, 2006

(65) Prior Publication Data

US 2006/0294034 A1 Dec. 28, 2006

(30) Foreign Application Priority Data

Jun. 24, 2005 (JP) ............... 2005-184353

(51) Int. Cl.
*G06N 5/00* (2006.01)
(52) U.S. Cl. .......................... 706/33; 706/45
(58) Field of Classification Search .................. 706/33, 706/45
See application file for complete search history.

(56) References Cited

U.S. PATENT DOCUMENTS

| | | | | | |
|---|---|---|---|---|---|
| 5,004,932 | A | * | 4/1991 | Nejime | 326/36 |
| 5,247,206 | A | * | 9/1993 | Castro | 706/35 |
| 5,297,237 | A | * | 3/1994 | Masuoka et al. | 706/25 |
| 5,633,989 | A | * | 5/1997 | Shin et al. | 706/35 |
| 7,277,758 | B2 | * | 10/2007 | DiLorenzo | 607/45 |

| | | |
|---|---|---|
| 2003/0177450 A1 * | 9/2003 | Nugent ............... 716/1 |

FOREIGN PATENT DOCUMENTS

| | | |
|---|---|---|
| JP | 5-89268 | 4/1993 |
| JP | 6-266867 | 9/1994 |
| JP | 6-290286 | 10/1994 |
| JP | 7-168901 | 7/1995 |
| JP | 2539177 | 7/1996 |
| JP | 2003-108914 | 4/2003 |
| JP | 2003-223790 | 8/2003 |
| JP | 2004-193312 | 7/2004 |
| JP | 2005-050424 | 2/2005 |

* cited by examiner

*Primary Examiner*—Wilbert L Starks, Jr.
(74) *Attorney, Agent, or Firm*—McDermott Will & Emery LLP

(57) ABSTRACT

An artificial neural network that can act like the real neural network according to the input history of signals input. The network includes a learning circuit that stores an input history of an input signal, an output circuit that is connected to the learning circuit, and a reset circuit that resets the input history stored in the learning circuit. The learning circuit changes a potential-change characteristic of an internal node included in the output circuit, according to the input history. The output circuit starts an output operation of data when a potential at the internal node exceeds a threshold value. The artificial neural network of this invention can operate almost in the same way as the real neural network, because it performs an output operation, such as an oscillating operation, in response to the history of the input signal.

18 Claims, 9 Drawing Sheets

ARTIFICIAL NEURAL NETWORK

TECHNICAL FIELD

The present invention relates to an artificial neural network. More particularly, the present invention relates to an artificial neural network that has a learning function.

BACKGROUND OF THE INVENTION

In recent years, many attempts have been made to provide computers different from a von Neumann computer and to provide artificial intelligence systems, by using artificial neural networks that are analogous to the neural network of living things. The neural network of living things is constituted of neurons and synapses connecting the neurons. The neuron includes a nerve cell, neurite, dendrite and the like. The excited state of any neuron is transmitted through a synapse to an adjacent neuron or an effector such as the muscle.

An artificial neural network analogous to the neural network is disclosed in Japanese Patent Laid Open No. H5-89268. This artificial neural network comprises a neuron circuit and a plurality of synapse circuits connected to the neuron circuit. The neuron circuit generates pulses when it is excited. In the network disclosed in Japanese Patent Laid Open No. H5-89268, the resistance of the resistor provided in each synapse circuit is changed, thereby varying the current-driven capability. Thus, the neuron circuit and such synapse circuits connected to the neuron circuit constitute the artificial neural network. When the current supplied to the neuron circuit exceeds a predetermined value, the neuron circuit is activated, and generates pulses that indicate that the neuron circuit is excited.

The artificial neural network disclosed in Japanese Patent Laid Open No. H5-89268 is activated (or excited) only when the input to the neuron circuit from the synapse circuits exceeds the predetermined value. That is, it acts quite differently from the real neural network. That is, in the real neural network, each neuron assumes an excitable state or a non-excitable state, depending on a history of input from the synapses. In the artificial neural network disclosed in Japanese Patent Laid Open No. H5-89268, however, the neuron circuit cannot act corresponding to such an input history.

Other techniques concerning artificial neural networks are disclosed in Japanese Patent Laid Open Nos. H6-266867, H6-290286, H7-168901, 2003-108914, and 2003-223790.

SUMMARY OF THE INVENTION

The present invention has been achieved to solve the problem described above. Therefore, an object of the invention is to provide an artificial neural network that can act more like a real neural network.

The above and other objects of the present invention can be accomplished by an artificial neural network comprising a learning circuit that stores an input history of an input signal; and an output circuit that is connected to the learning circuit, wherein the learning circuit changes a potential-change characteristic of an internal node included in the output circuit according to the input history, and the output circuit starts an output operation of data when a potential at the internal node exceeds a threshold value.

In the artificial neural network according to the present invention, an output operation, such as an oscillating operation, is performed in response to the history of the input signal. The artificial neural network can therefore operate in a way very similar to the real neural network.

In the present invention, it is desired that the learning circuit includes a variable resistance element connected between the internal node and a predetermined power-supply potential. Preferably, the variable resistance element is made of a phase-changing material that contains chalcogenide. Made of a material containing chalcogenide, the variable resistance element will need only a small current to write data and can write the data at a high speed. Since the input history of the signal is stored by using the variable resistance element, the artificial neural network can operate at a high speed and at low power consumption.

Preferably, the artificial neural network according to this invention further comprises a reset circuit that resets the input history stored in the learning circuit. In this case, the reset circuit preferably includes a reset switch for supplying a reset current to the variable resistance element, and a disconnecting switch for disconnecting the learning circuit and the output circuit from each other. Accordingly, the artificial neural network can easily be reset to an initial condition.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Before a preferred embodiment of the present invention is explained in detail, the basic configuration of an artificial neural network according to this invention will be explained.

Figure 1:
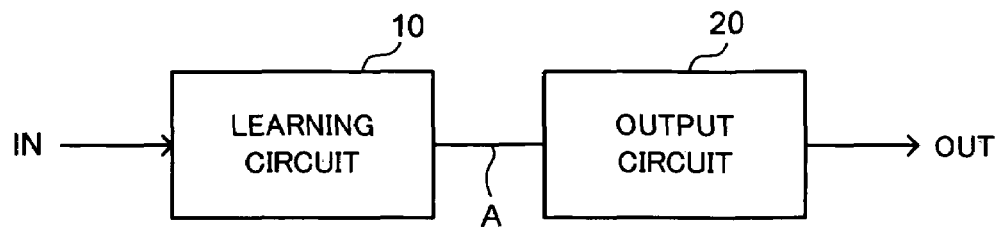
FIG. 1 is a block diagram of the basic configuration of an artificial neural network according to the present invention.

FIG. 1 is a block diagram of the basic configuration of an artificial neural network according to the present invention.

As shown in FIG. 1, the artificial neural network according to this invention is constituted of a learning circuit 10, and an output circuit 20. The learning circuit 10 receives an input signal IN. The output circuit 20 is connected to the learning circuit 10. The learning circuit 10 stores the input history of the signal IN. The circuit 10 changes the potential-change characteristic of an internal node A, i.e., the input terminal of the output circuit 20, according to the input history of the signal IN. On the other hand, the output circuit 20 is activated, or excited, when the potential at the internal node A exceeds a threshold value. When activated, the output circuit 20 starts an oscillating operation. Hence, an output signal OUT is shaped like a pulse when the output circuit 20 is activated (or excited). When the output circuit 20 is not activated (or not excited), the output signal OUT is held at a predetermined level.

When the input signal IN is activated, the learning circuit 10 changes the potential at the internal node A and stores the input history of the signal IN. According to the input history, the learning circuit 10 changes the speed at which the potential changes at the internal node A. The speed at which the potential changes at the internal node A therefore varies according to the integrated value of the input signal IN. If the speed at which the potential changes at the internal node A is increased on the basis of the integrated value of the input signal IN, the input circuit 20 will be activated within a shorter time. Thus, the learning circuit 10 performs learning on the basis of the input history.

Figure 2:
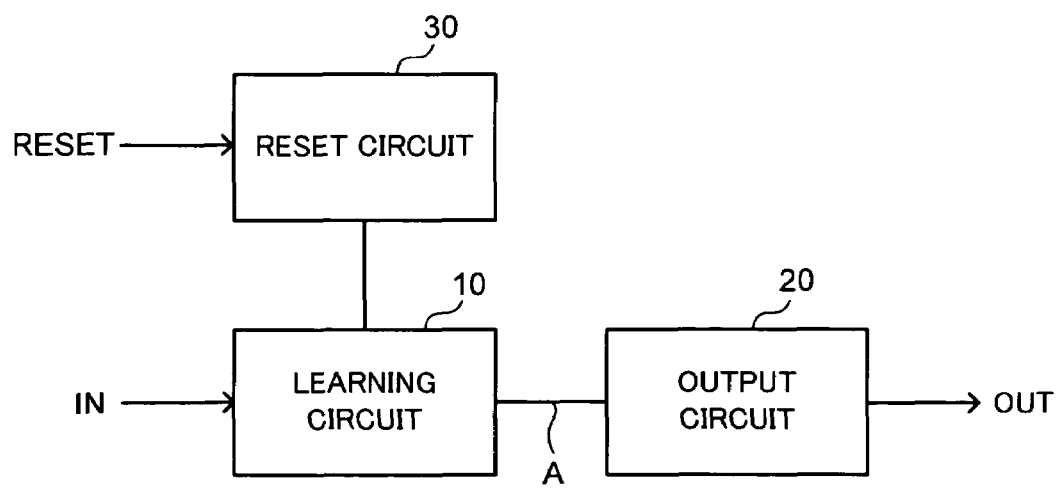
FIG. 2 is a block diagram of the basic configuration of an artificial neural network that has a reset function.

FIG. 2 is a block diagram of the basic configuration of an artificial neural network that has a reset function.

As can be seen from FIG. 2, the artificial neural network having a reset function is a combination of the basic structure of FIG. 1 and a reset circuit 30. The reset circuit 30 receives a reset signal RESET. When the reset signal RESET is activated, the reset circuit 30 resets the input history that the learning circuit 10 stores. The real neural network has no function like this. Nevertheless, it is greatly desired that artificial neural networks should have such a reset function.

The basic configuration of an artificial neural network according to this invention has been explained. Artificial neural networks according to embodiments of the present invention will be explained below in detail.

Figure 3:
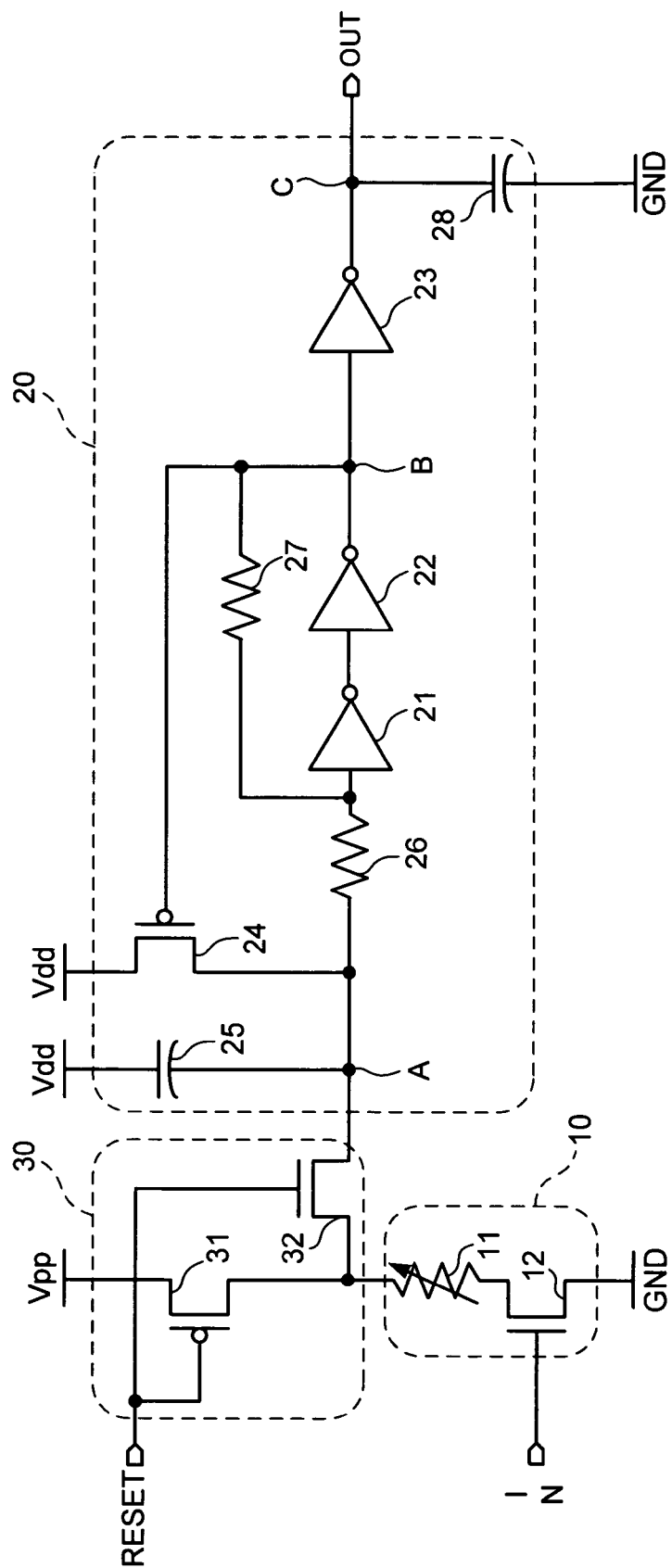
FIG. 3 is a circuit diagram of the configuration of an artificial neural network according to a preferred embodiment of the present invention.

FIG. 3 is a circuit diagram of the configuration of an artificial neural network according to a preferred embodiment of the present invention.

As shown in FIG. 3, the artificial neural network according to this embodiment includes the learning circuit 10, the output circuit 20, and the reset circuit 30. This network is a more specific form of the basic structure of the network shown in FIG. 2.

The learning circuit 10 is constituted of a variable resistor 11 and an input switch 12. The variable resistor 11 and the input switch 12 are connected in series between the internal node A and a ground potential GND. The internal node A is included in the output circuit 20.

The variable resistor 11 is made of a phase-changing material that contains chalcogenide. Chalcogenide is a compound of any element of group $VI_B$ or any element listed below oxygen in the periodic table. Namely, it is a compound of sulfur (S), selenium (Se) or tellurium (Te). Compounds of tellurium (Te), on the one hand, and germanium (Ge) or antimony (Sb), or both, on the other, can be exemplified as preferable chalcogenide. The phase-changing material containing chalcogenide can assume either amorphous phase or crystalline phase. It exhibits a relatively high resistance in the amorphous phase, and a relatively low resistance in the crystalline phase. Known as semiconductor devices utilizing such a phase-changing material are phase-changing devices disclosed in Japanese Patent Laid Open Nos. 2004-193312 and 2005-50424.

Figure 4:
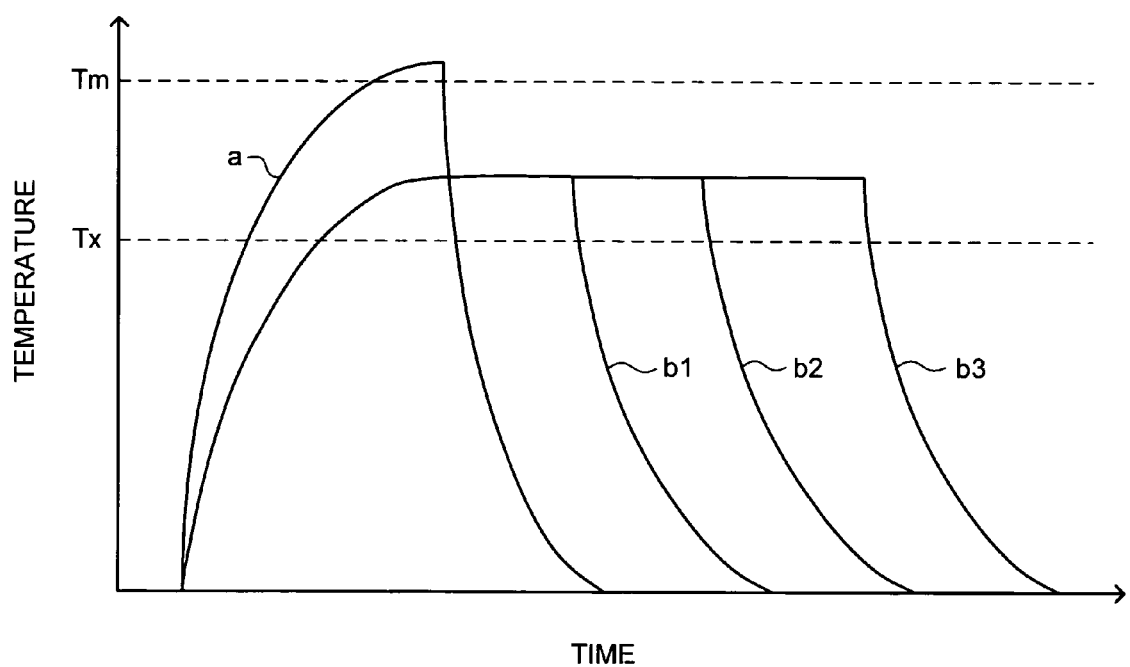
FIG. 4 is a graph for explaining a method of controlling the phase of the phase-changing material containing chalcogenide.

FIG. 4 is a graph for explaining a method of controlling the phase of the phase-changing material containing chalcogenide.

To reset the phase-changing material containing chalcogenide in amorphous phase, the material can be heated to a temperature higher than a melting point Tm and can then be cooled, as a curve a indicates in FIG. 4. To set the phase-changing material in crystalline phase, the material can be heated to a temperature lower than the melting point Tm or not lower than a crystallizing point Tx and can then be cooled as indicated by curves b1 to b3 in FIG. 4.

Most phase-changing devices that use chalcogenide store 1-bit data, utilizing the difference between the resistance that the phase-changing material exhibits in the amorphous phase and the resistance the material exhibits in the crystalline phase. Thus, the ratio of the crystal part to the amorphous part can be controlled stepwise or linearly, by adjusting the time for which the material is maintained at a temperature higher than the crystallizing point Tx. That is, the resistor as a whole can be crystalline if the material is held for a long time at a temperature lower than the melting point Tm or not lower than the crystallizing point Tx, as a curve b3 indicates in FIG. 4.

By contrast, only a part of the resistor is crystalline while the other part remains amorphous, if the material is held for a short time at a temperature lower than the melting point Tm but not lower than the crystallizing point Tx, as indicated by curve b1 or b2 in FIG. 4. If the ratio of the crystal part to the amorphous part is thus controlled, either stepwise or linearly, the resistance of the resistor can be varied in analog fashion.

To change the resistance of the variable resistor 11, it suffices to control the current flowing in the input switch 12 that is connected to the variable resistor 11. The current can be controlled by changing the on-time or the on-resistance. As shown in FIG. 3, the input switch 12 includes an N-channel MOS transistor. The gate electrode of the N-channel MOS transistor receives the input signal IN. Hence, a current will start flowing in the variable resistor 11 when the input signal IN rises above the threshold value of the input switch 12. The current flowing per unit time in the variable resistor 11 can be adjusted by adjusting the level of the input signal in the on-state.

The output circuit 20 mentioned above includes inverters 21 to 23, a P-channel MOS transistor 24, a capacitor 25, and resistors 26 and 27, and a capacitor 28. The inverters 21 to 23 are connected in series between the internal node A and the output node C. The P-channel MOS transistor 24 and the capacitor 25 are connected in parallel between power-supply potential Vdd and the internal node A. The resistor 26 is connected between the internal node A and the input terminal of the inverter 21. The resistor 27 is connected between the input terminal of the inverter 21 and the output terminal of the inverter 22. The capacitor 28 is connected between the output node C and the ground potential GND.

As shown in FIG. 3, an internal node B is connected to the gate electrode of the P-channel MOS transistor 24. Therefore, the internal node B will be at a low level when the potential at the internal node A falls below the threshold value of the inverter 21 as the capacitor 25 is discharged. Consequently, the P-channel MOS transistor 24 is turned on. In this embodiment, the P-channel MOS transistor has current-driven ability greater than that of the input switch 12 included in the learning circuit 10.

The potential at the internal node A therefore rises when the P-channel is turned on. The capacitor 25 is thereby charged again. Thereafter, the internal node B rises to a high level, and the P-channel MOS transistor 24 is turned off. Thus, as long as the input switch 12 included in the learning circuit 10 remains on, the capacitor 25 is discharged and charged repeatedly. The output signal OUT from the output node C is a pulse signal. As long as the input switch 12 included in the learning circuit 10 remains off, no paths for discharging the capacitor 25 exist, and the output signal OUT is held at the low level.

The reset circuit 30 includes a reset switch 31 and a disconnection switch 32. The reset switch 31 is connected between power-supply potential Vpp and the variable resistor 11. The disconnection switch 32 is connected between the internal node A and the variable resistor 11. The reset switch 31 and the disconnection switch 32 are constituted by a P-channel MOS transistor and an N-channel MOS transistor, respectively. The gate electrodes of these MOS transistors receive a reset signal RESET.

When the reset signal RESET is at the high level, the reset switch 31 turns on and the disconnecting switch 32 turns off. In this case, the learning circuit 10 remains connected to the output circuit 20. Conversely, the reset switch 31 is on and the disconnection switch 32 is off when the reset signal RESET is at the low level. In this case, the learning circuit 10 is disconnected from the output circuit 20, and a reset current can be supplied to the variable resistor 11 from the power-supply potential Vpp.

The power-supply potential Vpp is higher than the power-supply potential Vdd applied to the output circuit 20. When the reset current flows in the variable resistor 11, the temperature of the chalcogenide material of the variable resistor 11 rises above the melting point Tm. As a result, the chalcogenide material can become amorphous state.

Described above is the circuit configuration of the artificial neural network according to this embodiment. As to how this artificial neural network operates will be explained below.

Figure 5:
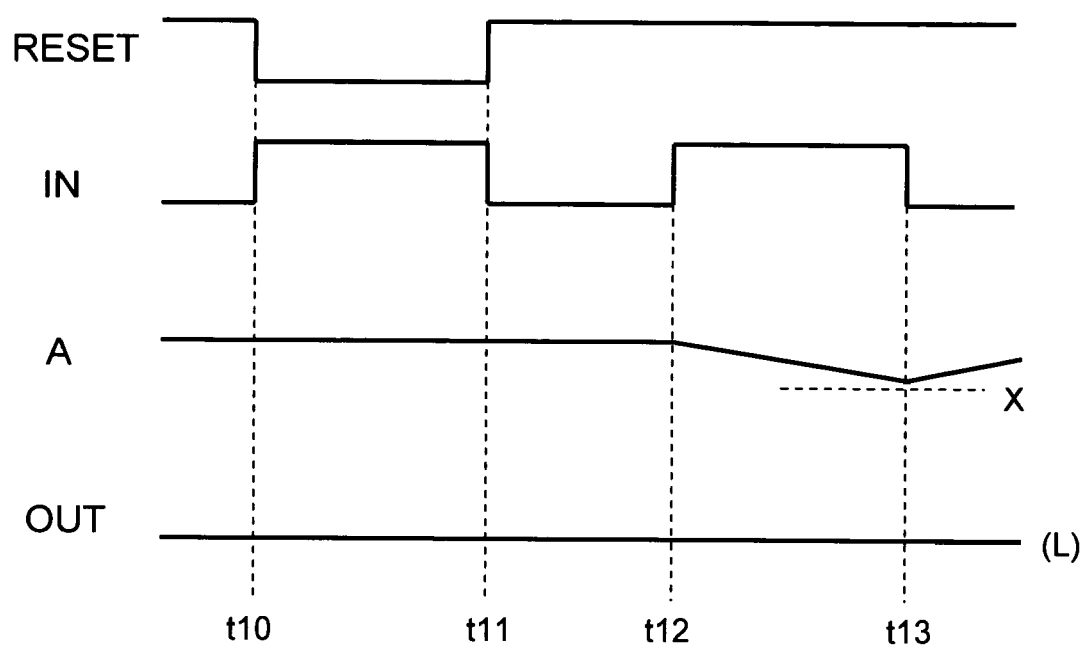
FIG. 5 is a timing chart for explaining the operation of the artificial neural network according to a preferred embodiment of the present invention that has learned nothing at all.
Figure 6:
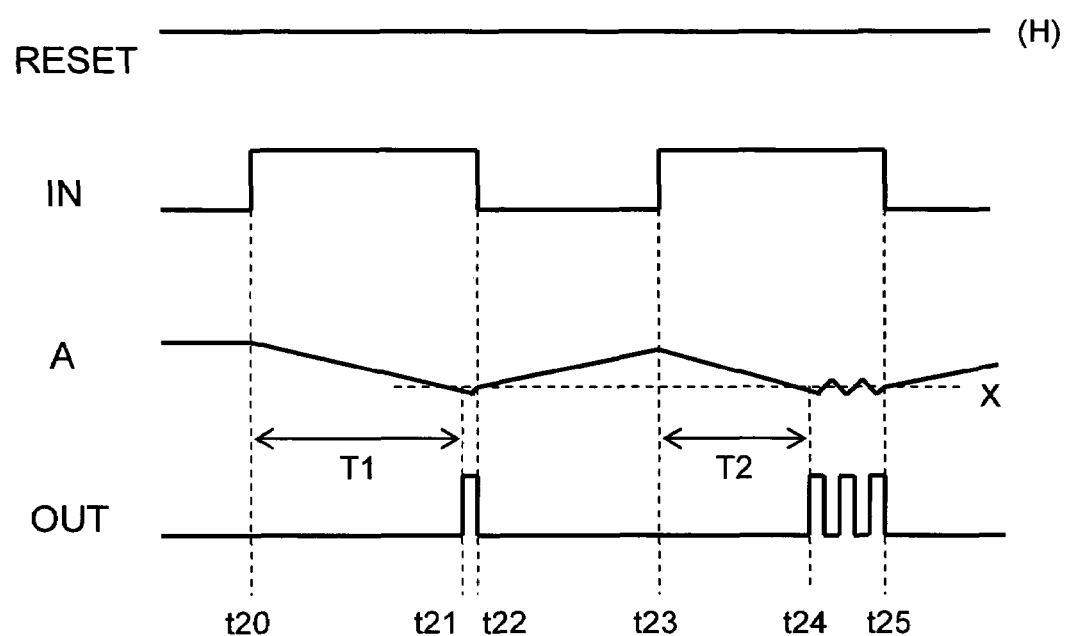
FIG. 6 is a timing chart for explaining the operation of the artificial neural network according to a preferred embodiment of the present invention that has learned a little.
Figure 7:
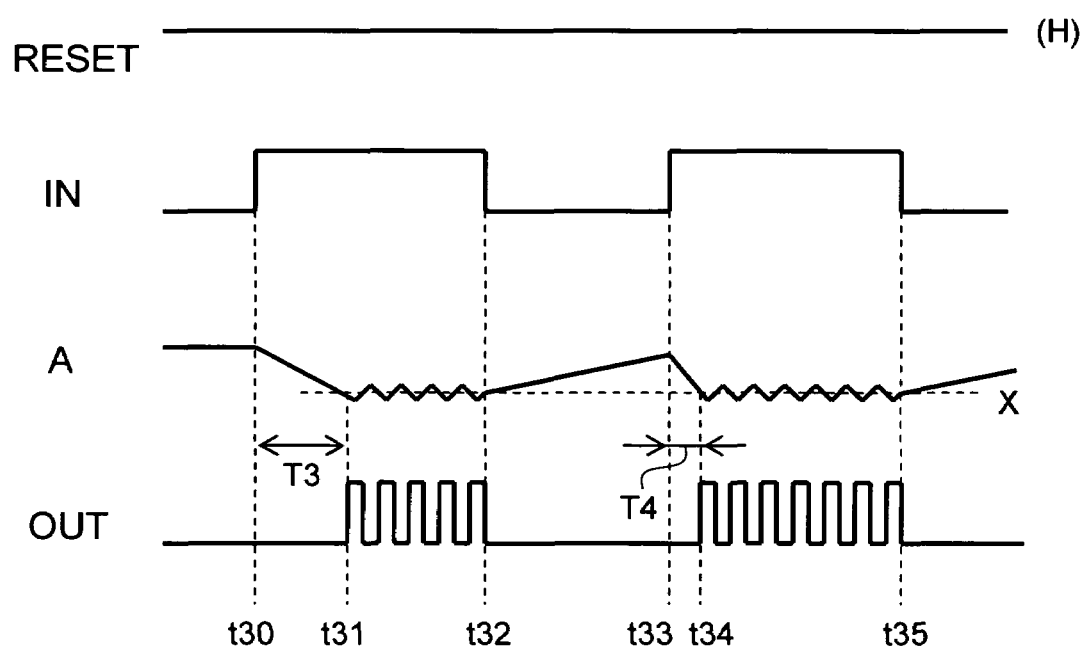
FIG. 7 is a timing chart for explaining the operation of the artificial neural network according to a preferred embodiment of the present invention that has learned much.

FIGS. 5 to 7 are timing charts for explaining the operation of the artificial neural network according to the present embodiment.

First, the reset signal RESET is set to the low level during a period between time t10 and time t11 as shown in FIG. 5. The input signal IN is thereby set to the high level. Both the reset switch 31 and the input switch 12, both shown in FIG. 3, are therefore turned on. Hence, a current path develops between the power-supply potential Vpp and the ground potential GND. A reset current therefore flows to the variable resistor 11.

Since the reset current is relatively large, the temperature of the chalcogenide material of the variable resistor 11 rises above the melting point Tm when the reset current flows in the variable resistor 11. When the reset signal rises to the high level thereafter and its supply is stopped, the chalcogenide material of the variable resistor 11 is cooled. As a result, the chalcogenide material becomes amorphous state as a whole. As indicated above, the chalcogenide material exhibits high resistance while remaining amorphous. The variable resistor 11 is thus reset completely.

In the process of resetting the variable resistor 11 is being reset, the disconnecting switch 32 is held off. Therefore, the reset current impose no influence on the output circuit 20. While the variable resistor 11 remains reset, the internal nodes A and B are stable at the high level. The output signal OUT is therefore maintained at the low level.

After the variable resistor 11 is thus reset, the input signal IN is set to the high level again during the period between time t12 and time t13. The charge is applied from the capacitor 25 to the ground potential GND via the disconnecting switch 32, the variable resistor 11, and the input switch 12. The potential at the internal node A falls. Nevertheless, the variable resistor 11 remains amorphous and has a high resistance immediately after it is reset. The time constant defined by the capacitor 25 and the variable resistor 11 is large. Therefore, the potential at the internal node A cannot rise above the threshold value X of the inverter 21 until time t13 when the input signal IN falls back to the low level. Hence, the output signal OUT remains unchanged at the low level.

This means that the output circuit 20 is not activated, or not excited, even if the signal IN having a pulse width equal to the period between time t12 to time t13 is input immediately after the variable resistor is reset. At time t13, the input switch 12 is turned off. An electric charge is then applied through the resistors 26 and 27 to the capacitor 25 from the internal node B driven at the high level by the inverter 22. The potential at the internal node A therefore rises again.

On the other hand, a current of a predetermined value flows in the variable resistor 11 for the period between time t12 and time t13, thereby generating heat in the resistor 11. The chalcogenide material of the variable resistor 11 is therefore heated to a temperature lower than the melting point Tm but not lower than the crystallizing point Tx. The chalcogenide material is crystallized in part. As a result, the resistance of the variable resistor 11 becomes a little lower than the value the resistor 11 had immediately after it was reset.

Immediately after the variable resistor 11 is reset, no input history is stored. That is, the artificial neural network has learned nothing at all. Therefore, the output circuit 20 responds to the input signal IN, but slowly. Inevitably, the output signal OUT may not change at all in response to the input signal IN that is activated (set to the high level).

When the input signal IN is set to the high level during the period between time t20 and time t22 as shown in FIG. 6, the potential at the internal node A falls again as a current flows in the variable resistor 11. At this time, some input history is stored by virtue of the pulses input during the period between time t12 and time t13 (in FIG. 5). In other words, the artificial neural network has learned a little. The resistance of the variable resistor 11 has therefore fallen a little from the value it has when the network learns nothing. Thus, the time constant defined by the capacitor 25 and the variable resistor 11 has decreased a little. Consequently, the potential-change characteristic of the internal node A varies, decreasing the potential at the internal node A faster than the case that the artificial neural network has learned nothing at all.

Hence, the potential at the internal node A exceeds the threshold value X of the inverter 21 at time t21. The output signal OUT therefore rises to the high level. At this time, the internal node B is at the low level. The P-channel MOS transistor 24 is turned on, and the potential at the internal node A therefore rises at once. The time for which the output signal OUT remains at the high level is therefore very short. The output signal OUT therefore becomes a pulse signal.

Thus, the input circuit 20 responds to the input signal IN somewhat quickly if the artificial neural network has learned only a little. Therefore, the output circuit 20 generates pulses in small numbers if the signal IN input to it has a pulse width equal to the period between time t20 to time t22. That is, the output circuit 20 is active and performs an oscillating operation for a short period.

Also in this case, a current of the predetermined value flows in the variable resistor 11 for the period between time t20 and time t22. The chalcogenide material of the variable resistor 11 is crystallized in a greater part. The resistance of the variable resistor 11 further falls. The potential at the internal node A therefore falls faster when the input signal IN is set to the high level during the period between time t23 and time t25. Accordingly, the output circuit 20 generates more pulses.

In the case shown in FIG. 6, the potential at the internal node A exceeds the threshold value X of the inverter 21 at time t24, and a period T2 between time t23 and time t24 is shorter than a period T1 between time t20 and time t21. Thus, the artificial neural network learns more as the input history of the signal IN increases. The output circuit 20 responds to the input signal IN gradually faster.

When the input signal IN rises to the high level during the period between time t30 and time t32 as shown in FIG. 7, the time constant defined by the capacitor 25 and the variable resistor 11 further decreases because the network has already learned more due to the several pulses input as explained above. Consequently, the potential at the internal node A falls faster than the case that the network learns a little.

Therefore, the potential at the internal node A exceeds the threshold value X of the inverter 21 at time t31 when a period T3 (<period T2) expires from time t30. The output signal OUT becomes a pulse signal. Since the output circuit 20 quickly responds to the input signal once the network has learned much, it generates many pulses if it receives the input signal IN having a pulse width equal to the period between time t30 to time t32. That is, the output circuit 20 performs an oscillating operation for a long time.

In this case, a current of the predetermined value flows in the variable resistor 11 for the period between time t30 and time t32. The chalcogenide material of the variable resistor 11 is crystallized in a still greater part. The resistance of the variable resistor 11 falls still more. Therefore, the potential at the internal node A falls even faster when the input signal IN is set to the high level during the period between time t33 and time t35. The output circuit 20 generates even more pulses. In the case shown in FIG. 7, the potential exceeds the threshold value X of the inverter 21 at time t34, and a period. T4 between time t33 and time t34 is shorter than the period T3 between time t30 and time t31.

Thus, the learning proceeds as the input history increases in the artificial neural network according to the present embodiment. The more the learning proceeds, the faster the output circuit 20 responds to the input signal IN. This function of the network is quite similar to the function of the real neural network. In other words, the artificial neural network can operate in almost the same way as the real neural network. Hence, computers and artificial intelligence systems, each analogous to the real neural network, can be provided if many artificial neural networks of this type are connected, forming a network system.

To erase the input history, the reset signal RESET is set to the low level as shown in FIG. 5, causing a reset current to flow in the variable resistor 11. The chalcogenide material of the variable resistor 11 is thereby rendered amorphous state again.

Figure 8A:
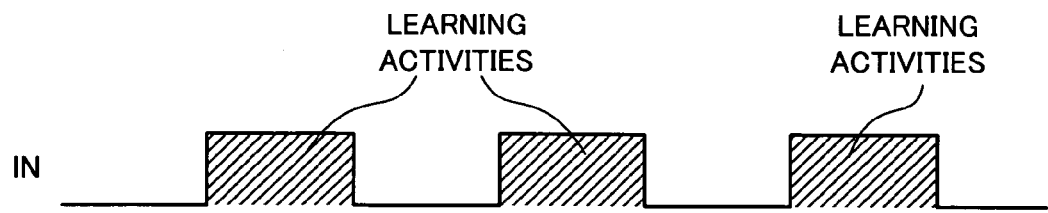
FIG. 8A is a waveform diagram of an input signal In where it is held at a specific level while activated.
Figure 8B:
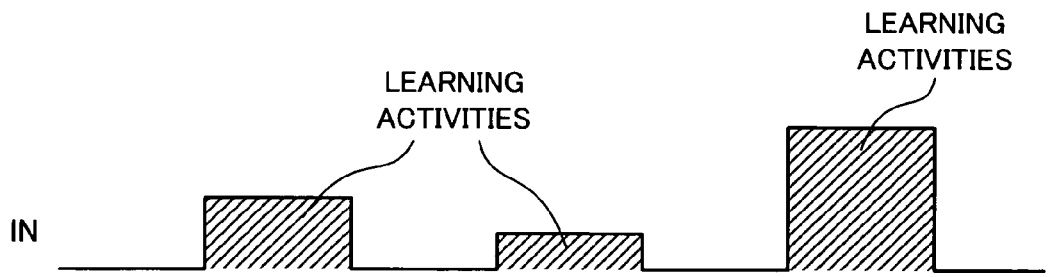
FIG. 8B is a waveform diagram of an input signal In where it changes in level while activated.

While activated, the input signal can be held at a specific level or can change in level. Assume that the input signal IN is held at a specific level while activated, as is shown in FIG. 8A. The time the input signal IN remains activated is directly the integrated value of the input signal IN. Thus, the learning proceeds in proportion to the time the input signal IN remains activated. Assume that the input signal IN changes in level while activated, as shown in FIG. 8B. The product of the level of the input signal IN and the time the input signal IN remains activated is the integrated value of the input signal IN. In this case, the learning proceeds in proportion to the product of the level of the input signal IN and the time the input signal IN remains activated.

In the case explained above, the output circuit 20 performs an oscillating operation while it remains activated. Nevertheless, the operating mode of the output circuit 20 is not limited to this. For example, the circuit 20 can invert the logic level of the output signal OUT. This operation can be performed by setting the current-driven ability of the P-channel MOS transistor 24 to a value smaller than the current-driven ability of the input switch 12 that is included in the learning circuit 10.

The current-driven ability of the P-channel MOS transistor 24 can be smaller than that of the input switch 12. In this case, the potential at the internal node A exceeds the threshold value X of the inverter 21 at time t41 if the signal IN input to the learning circuit 10 is at the high level. The output signal OUT therefore rises to the high level. The potential at the internal node B is high at this time, whereby the P-channel MOS transistor 24 is turned on.

Nonetheless, the potential at the internal node A does not increase, remaining higher than the threshold value X. This is because the current-driven ability of the P-channel MOS transistor 24 is relatively small. The output signal OUT therefore stays at the high level until the input signal IN falls to the low level at time t42. A period T5 during which the output signal OUT remains at the high level is shorter by the time the output circuit 20 requires to be activated.

Figure 9:
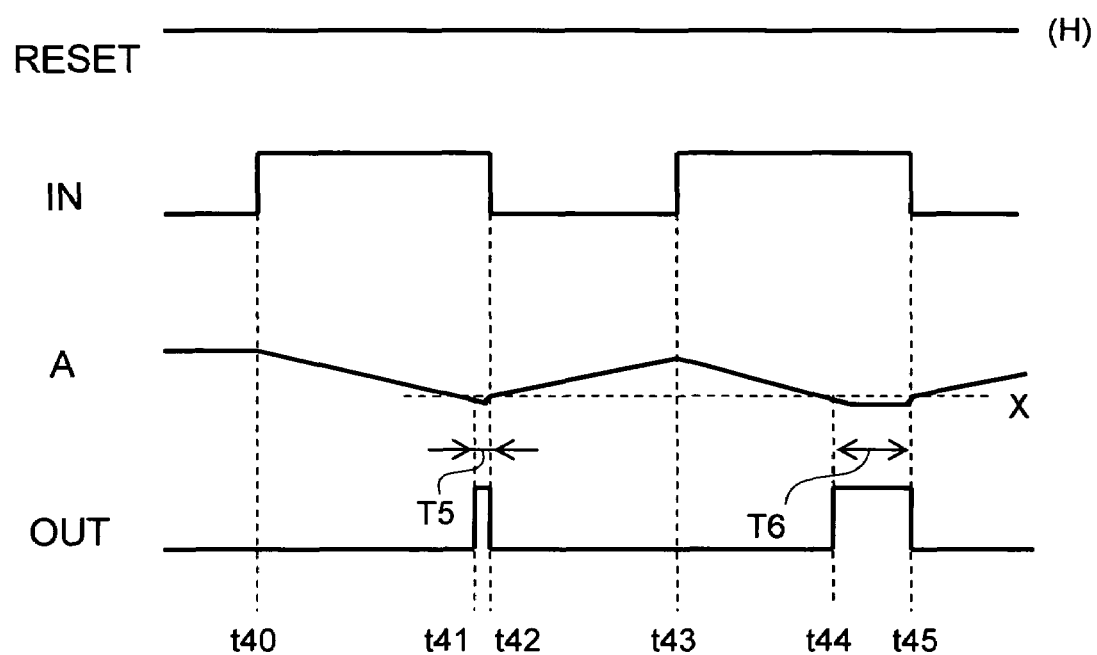
FIG. 9 is another timing chart for explaining the operation of the artificial neural network according to a preferred embodiment of the present invention that has learned a little.

In this case, a current of the predetermined value flows in the variable resistor 11 for the period between time t40 and time t42. The chalcogenide material of the variable resistor 11 is therefore crystallized in a still greater part. The resistance of the variable resistor 11 falls still more. Therefore, the potential at the internal node A falls even faster if the input signal IN is at the high level during the period between time t43 and time t45. The output circuit 20 holds the output signal OUT at the high level for a long time. In the case shown in FIG. 9, the potential at the internal node A exceeds the threshold value x of the inverter 21 at time t44. Consequently, the output signal OUT is held at the high level for a period T6 (>T5) between time t44 and time t46.

Figure 10:
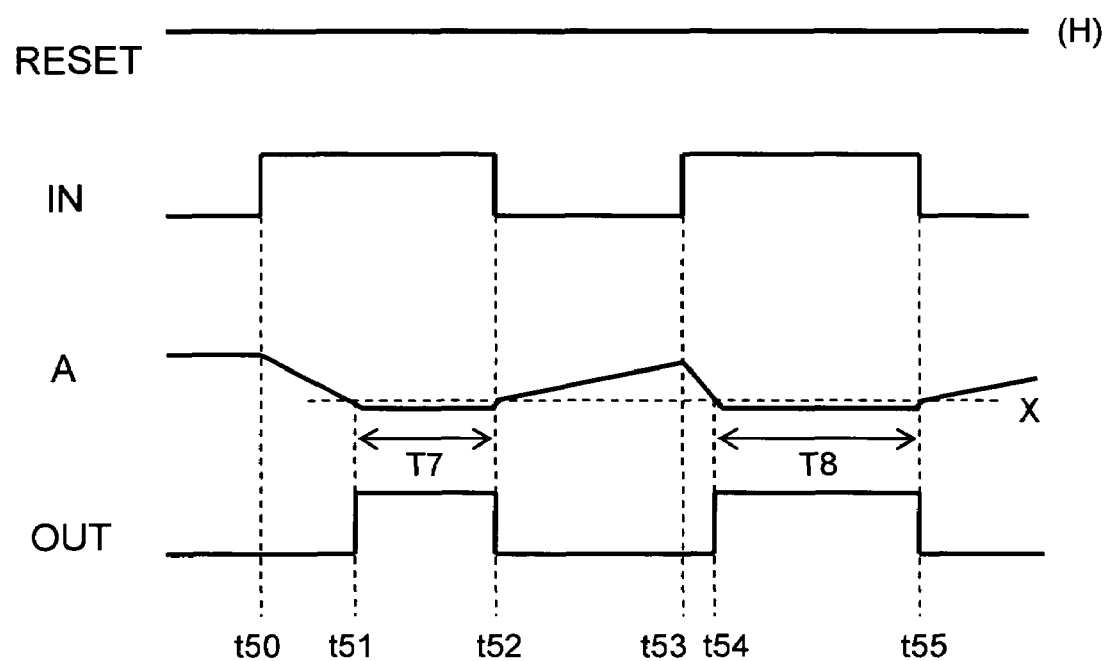
FIG. 10 is another timing chart for explaining the operation of the artificial neural network according to a preferred embodiment of the present invention that has learned much.

Once the artificial neural network has learned much, the potential at the internal node A falls faster. When the input signal IN is set to the high level again during a period between time t50 and time t52 as is shown in FIG. 10, the potential at the internal node A rises again above the threshold value X of the inverter 21. As a result, the output signal OUT remains at the high level for a period T7 (>T6) between time t51 and time t52. When the input signal IN is again set to the high level during a period between time t53 and time t55 after the learning further has further proceeded, the potential at the internal node A rises above the threshold value X of the inverter 21 at time t54. The output signal OUT is therefore held at the high level for a period T8 (>T7) between time t54 and time t55.

Thus, the output circuit 20 can not only perform oscillating operations, but also invert the logic level of the output signal OUT, as long as it remains activated. Hence, the delay of the output signal OUT with respect to the input signal IN gradually decreases as the learning proceeds. The output signal OUT can have a waveform similar to that of the input signal IN. If the output circuit 20 performs an oscillating operation, the artificial neural network will be self-programmed. On the contrary, if the output circuit 20 operates as explained above, the artificial neural network will be programmed according to the widths of pulses input.

The present invention is in no way limited to the aforementioned embodiments, but rather various modifications are possible within the scope of the invention as recited in the claims, and naturally these modifications are included within the scope of the invention.

For example, in the embodiment described above, the variable resistor 11 that is made of a phase-changing material containing chalcogenide can be replaced by an element that can store analog quantities, such as an EEPROM. If an EEPROM is used, the charge applied to the floating gate of the EEPROM is controlled, either linearly or stepwise. The EEPROM can then store an analog quantity. However, the variable resistor made of a material containing chalcogenide is preferable for two reasons. First, it needs a small current of 1 mA or less to write data (to be crystallized). Second, it can write data within a short time of 50 ns or less. In view of this, the variable resistor should be made of a phase-changing material that contains chalcogenide.

In the embodiment described above, the variable resistor 11 and the input switch 12 are connected in series and arranged in the order mentioned, between the internal node A and the ground potential GND. The order in which the resistor 11 and the switch 12 are arranged can be reversed.

Further, the learning circuit 10 can be connected to the power-supply potential Vdd, not to the ground potential GND as in the embodiment, and the capacitor 25 included in the output circuit 20 can be connected to the ground potential GND, not to the power-supply potential Vdd as in the embodiment. In this case, the speed of charging the capacitor 25 changes according to the input history. Furthermore, the configuration of the output circuit 20 can be changed, so long as the output circuit 20 can perform an oscillating operation if the potential at the internal node exceeds a threshold value.

As explained above, according to the present invention, an artificial neural network that can act more like the real neural network can be provided.

What is claimed is:

1. An artificial neural network comprising:
a learning circuit that stores an input history of an input signal; and
an output circuit that is connected to the learning circuit,
wherein the learning circuit changes a potential-change characteristic of an internal node included in the output circuit according to the input history, and the output circuit starts an output operation of data when a potential at the internal node exceeds a threshold value.

2. The artificial neural network as claimed in claim 1, wherein the learning circuit changes the potential at the internal node in response to activation of the input signal.

3. The artificial neural network as claimed in claim 2, wherein the learning circuit changes a speed of changing the potential at the internal node according to the input history.

4. The artificial neural network as claimed in claim 1, wherein the learning circuit includes a variable resistance element connected between the internal node and a predetermined power-supply potential.

5. The artificial neural network as claimed in claim 4, wherein the variable resistance element includes a phase-changing material containing chalcogenide.

6. The artificial neural network as claimed in claim 5, wherein the learning circuit further includes an input switch that is connected in series to the variable resistance element, and the input signal is supplied to a control terminal of the input switch.

7. The artificial neural network as claimed in claim 4, further comprising a reset circuit that resets the input history stored in the learning circuit.

8. The artificial neural network as claimed in claim 7, wherein the reset circuit includes a reset switch for supplying a reset current to the variable resistance element, and a disconnecting switch for disconnecting the learning circuit and the output circuit from each other.

9. The artificial neural network as claimed in claim 1, wherein the output circuit starts an oscillating operation when the potential at the internal node exceeds the threshold value.

10. The artificial neural network as claimed in claim 1, wherein the output circuit inverts a logic level of an output signal when the potential at the internal node exceeds the threshold value.

11. An artificial neural network that starts an output operation of signals when a potential at an internal node exceeds a threshold value, the artificial neural network comprising:
a variable resistance element and an input switch that are connected in series between the internal node and a first power-supply potential; and
a capacitance element that is connected between the internal node and a second power-supply potential.

12. The artificial neural network as claimed in claim 11, wherein the variable resistance element includes a phase-changing material containing chalcogenide.

13. The artificial neural network as claimed in claim 11, further comprising a reset switch that is connected between a third power-supply potential and the variable resistance element, and a disconnecting switch that is connected between the internal node and the variable resistance element.

14. The artificial neural network as claimed in claim 13, wherein the reset switch and the disconnecting switch are complementarily rendered conducting.

15. An artificial neural network comprising:
a capacitor;
a learning circuit that changes a speed of discharging or charging the capacitor, according to an integrated value of input signals; and
an output circuit that is activated when the voltage across the capacitor exceeds a threshold value.

16. The artificial neural network as claimed in claim 15, wherein the learning circuit includes a variable resistance element that has a resistance corresponding to the integrated value of the input signals.

17. The artificial neural network as claimed in claim 15, wherein, once activated, the output circuit performs an oscillating operation until the input signal is disabled.

18. The artificial neural network as claimed in claim 15, wherein, once activated, the output circuit inverts an output signal until the input signal is disabled.

* * * * *